United States Patent [19]

Yamashita

[11] Patent Number: 4,709,287
[45] Date of Patent: Nov. 24, 1987

[54] HEAD HEIGHT ADJUSTMENT CONSTRUCTION IN MAGNETIC RECORDING AND REPRODUCING APPARATUS WITH ROTARY CYLINDER

[75] Inventor: Tatsumaro Yamashita, Shibata, Japan

[73] Assignee: Alps Electric Co., Ltd., Japan

[21] Appl. No.: 772,851

[22] Filed: Sep. 5, 1985

[30] Foreign Application Priority Data

Sep. 5, 1984 [JP] Japan ............................ 59-133938[U]

[51] Int. Cl.$^4$ ................................................. G11B 5/52
[52] U.S. Cl. .................................. 360/109; 360/130.24
[58] Field of Search ............ 360/104, 109, 129, 130.24

[56] References Cited

U.S. PATENT DOCUMENTS

| 4,080,639 | 3/1978 | Gunschmann | 360/130.24 X |
| 4,363,047 | 12/1982 | Maruyama | |
| 4,507,696 | 3/1985 | Hutter | 360/104 X |

FOREIGN PATENT DOCUMENTS 59-165233  9/1984  Japan ................................... 360/109

Primary Examiner—A. J. Heinz
Attorney, Agent, or Firm—Guy W. Shoup

[57] ABSTRACT

A head height adjustment construction in a magnetic recording and reproducing apparatus with a rotary cylinder for use in a VTR, for example, includes a lower fixed drum, an upper rotary drum axially spaced from and rotatable with respect to the lower fixed drum, the upper rotary drum having a tapered surface slanted upwardly in a radially outward direction thereof, a head attachment plate having one end mounted on the upper rotary drum and supporting a head on an opposite end thereof, and an adjustment screw threaded in the upper rotary drum and held against the head attachment plate. When the height of the head is to be adjusted, the adjustment screw is turned about its own axis for spacing the opposite end of the head attachment plate away from the tapered surface. After the head height has been adjusted, a surface of the head which is held in sliding contact with a magnetic tape is directed upwardly toward a plane in which the upper rotary drum is rotatable.

2 Claims, 7 Drawing Figures

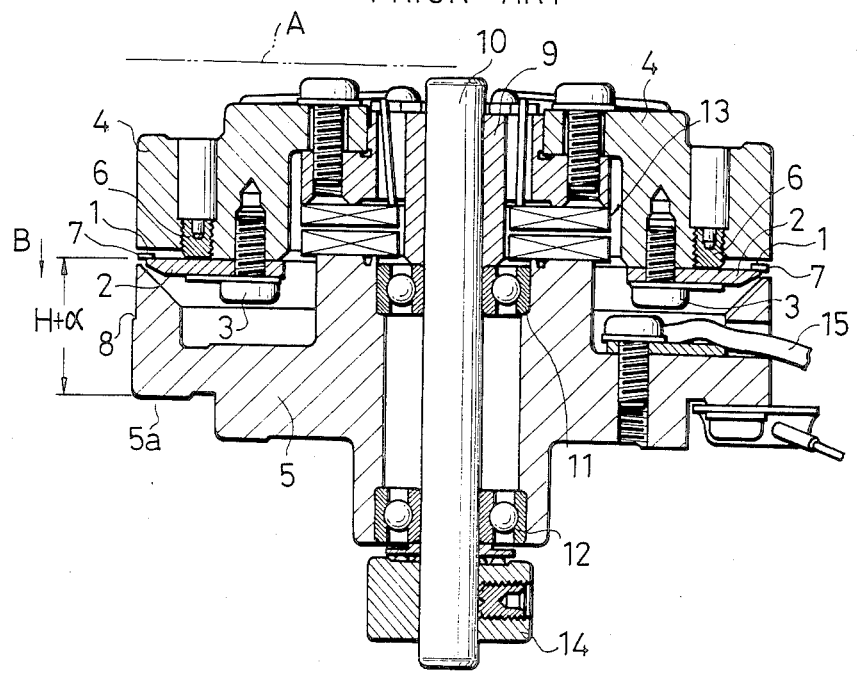
Fig.4
PRIOR ART
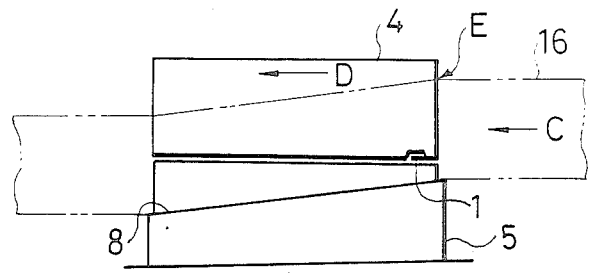
PRIOR ART Fig.5

HEAD HEIGHT ADJUSTMENT CONSTRUCTION IN MAGNETIC RECORDING AND REPRODUCING APPARATUS WITH ROTARY CYLINDER

BACKGROUND OF THE INVENTION

The present invention relates to a head height adjustment construction in a magnetic recording and reproducing apparatus with a rotary head for use in a video tape recorder (hereinafter referred to as "VTR") or the like.

FIG. 4 of the accompanying drawings illustrates a conventional head height adjustment construction, the view showing in cross section a magnetic recording and reproducing apparatus having a rotary drum, prior to fine adjustment thereof, for use in a VTR. The prior arrangement includes head attachment plates 2 each supporting a head 1 on one end thereof and fastened at an opposite end to the lower surface of an upper rotary drum 4 with an attachment screw 3. The head attachment plates 2 extend parallel to a plane A in which the rotary drum 4 is rotatable. Each head 1 defines a gap having a lower end spaced from a reference surface 5a of a lower fixed drum 5 by a distance which is greater than a prescribed height H by a small interval (about 10 m). By depressing each of the head attachment plates 2 with an adjustment screw 6 threaded in a threaded hole defined in the upper rotary drum 4, the height of the head 1 exposed in a head attachment window 7 can be adjusted little by little in the direction of the arrow B. Such height adjustment is completed when the height of the head 1 has reached the prescribed height H. It would actually be of importance to measure the head height from a lead 8 of the lower fixed drum 5. Since it would be highly difficult to measure such a height, however, the heat height is normally measured with a microscope from the reference surface 5a of the lower fixed drum 5.

A rotatable shaft 10 is fixed centrally to the upper rotary drum 4 by a sleeve 9 and is rotatably supported on the lower fixed drum 5 by bearings 11, 12. A rotary transformer 13 for transmitting signals is disposed between the upper rotary drum 4 and the lower fixed drum 5. A bushing 14 is mounted on an end of the shaft 10 which projects from the lower fixed drum 5. A head cable 15 is connected to the heads 1.

FIG. 5 shows the manner in which a tape travels in the magnetic recording and reproducing apparatus. A magnetic tape 16 travels in the direction of the arrow D while wound around the upper rotary drum 4 and the lower fixed drum 5 through more than 180°, with a lower tape edge extending along the lead 8. Since the upper rotary drum 4 rotates at high speed in the direction of the arrow D to rotate the heads 1, the gaps of the heads 1 where thet are slidably contact the tape 16 slide on a magnetic surface of the magnetic tape 1 for recording and reproducing signals on and from the magnetic tape 1.

With the prior head height adjustment construction, the surfaces of the upper rotary drum 4 which confront the head attachment plates 2 lie parallel to the plane A. Therefore, when fine adjustment of the head height is completed by depressing the free end of the head attachment plate 2 toward the lower fixed drum 5 with the adjustment screw 6, a surface 1a of the head 1 for slidable contact with the tape 16 is directed dowardly as shown in FIG. 6. Inasmuch as the lower edge of the magnetic tape 16 is especially subjected to smaller tension and held against the heads 1 under smaller presser in the position E where the magnetic tape 16 starts engaging the drums 4, 5, the head 1 is liable to disengage from the magnetic tape 16 in the vicinity of a lower end n of the gap of the head 1. Designated at m is an upper end of the gap of the head 1. As the clearance between the gap (m - n) of the head 1 and the magnetic tape 16 is increased, the head 1 has difficulty in picking up the magnetic flux from the magnetic tape 16, resuling in a so-called spacing loss which reduces a reproduced output produced from the magnetic tape 16 as it starts engaging the drums 4, 5. As a consequence, the waveform of the reproduced output has rounded portions as shown in FIG. 7 and the head sensitivity is reduced particularly when the magnetic tape begins to engage the drums 4, 5, with the result that a reproduced image will suffer from noise in its upper portion.

SUMMARY OF THE INVENTION

It is an object of the present invention to provide a head height adjustment construction in a magnetic recording and reproducing apparauts with a rotary cylinder, the head height adjustment construction being free from any spacing loss which would otherwise occur as a magnetic tape starts engaging rotary and fixed drums, thus preventing any reduction in a reproduced signal output.

According to the present invention, a head height adjustment construction in a magnetic recording and reproducing apparatus with a rotary cylinder, includes a lower fixed drum, an upper rotary drum axially spaced from and rotatable with respect to the lower fixed drum, the upper rotary drum having a tapered surface slanted upwardly in a radially outward direction thereof, a head attachment plate having one end mounted on the upper rotary drum and supporting a head on an opposite end thereof, and an adjustment screw threaded in the upper rotary drum and held against the head attachment plate. When the height of the head is to be adjusted, the adjustment screw is turned about its own axis for spacing the opposite end of the head attachment plate away from the tapered surface. After the head height has been adjusted, a surface of the head which is held in sliding contact with a magnetic tape is directed upwardly toward a plane in which the upper rotary drum is rotatable.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a fragmentary cross-sectional view of a conventional head height adjustment construction in a magnetic recording and reproducing apparatus for use in a VTR;

FIG. 5 is a side elevational view showing the manner in which a magnetic tape runs in the magnetic recording and reproducing apparatus shown in FIG. 4;

DESCRIPTION OF THE PREFERRED EMBODIMENT

Figure 2:
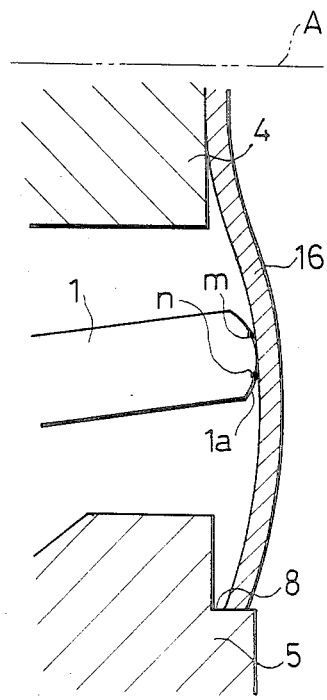
FIG. 2 is an enlarged fragmentary cross-sectional view showing the manner in which a head and a magnetic tape contact each other in a position wherein the magnetic tape starts engaging drums.
Figure 3:
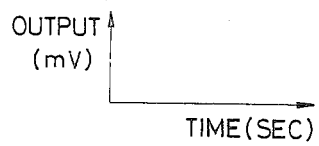
FIG. 3 is a diagram illustrative of an envelope waveform of a signal from the magnetic recording and reproducing apparatus.
Figure 6:
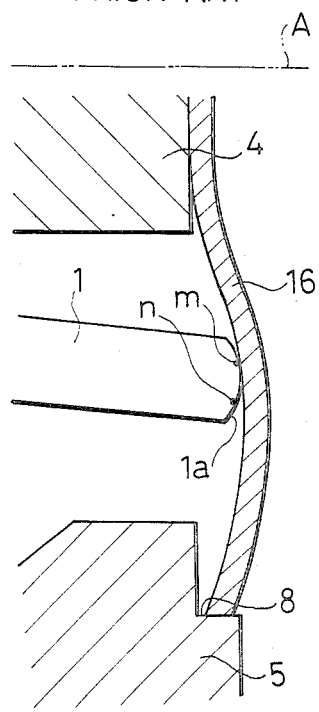
FIG. 6 is an enlarged fragmentary cross-sectional view showing the manner in which a head and a magnetic tape contact each other in a position wherein the magnetic tape starts engaging drums in the magnetic recording and reproducing apparatus of FIG. 4.
Figure 7:
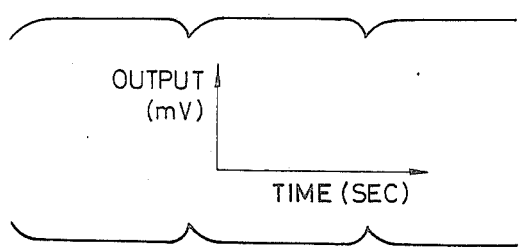
FIG. 7 is diagram illustrative of an envelope waveform of a signal from the magnetic recording and reproducing apparatus of FIG. 4.

The present invention will be described with reference to FIGS. 1 through 3. Like or corresponding parts in FIGS. 1 and 2 are denoted by like or corresponding reference characters in FIGS. 4 through 6.

Figure 1:
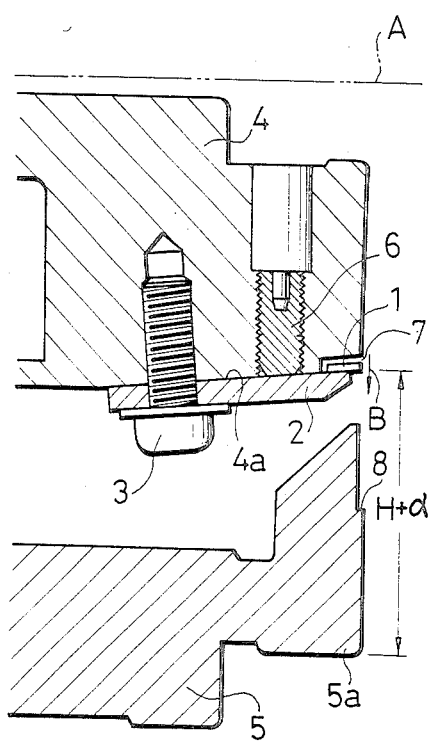
FIG. 1 is a fragmentary cross-sectional view of a head height adjustment construction according to the present invention, in a magnetic recording and reproducing apparatus for use in a VTR.

FIG. 1 shows a head height adjustment construction according to the present invention. A head attachment plate 2 with a head 1 mounted on one end thereof has an opposite end secured by an attachment screw 3 to a lower tapered surface 4a of an upper rotary drum 4. The tapered surface 4a is slanted upwardly in a radially outward direction of the upper rotary drum 4 and has an outer edge contiguous to a head attachment window 7. Therefore, the head attachment plate 2 extending along the tapered surface 4a is also slanted with respect to a plane A in which the upper rotary drum 4 is rotatable. With the parts thus assembled, the head 1 defines a gap having a lower end spaced from a reference surface 5a of a lower fixed drum 5 by a distance which is greater than a prescribed height H by a small interval (about 10 m).

By depressing the head attachment plate 2 with an adjustment screw 6 threaded in a threaded hole defined in the upper rotary drum 4, the free end of the head attachment plate 2 is spaced from the tapered surface 4a to adjust the height of the head 1 little by little in the direction of the arrow B. Such height adjustment is finished when the height of the head 1 has reached the prescribed height H. Since the head attachment plate 2 is attached to the tapered surface 4a, a surface 1a of the head 1 which is held in sliding contact with a magnetic tape 16 is slightly directed obliquely upwardly toward the plane A, as illustrated in FIG. 2.

With the sliding surface 1a of the head 1 being slightly directed obliquely upwardly toward the plane A, the magnetic tape 16 can be brought into reliable contact with the gap (m - n) in the head 1 in the vicinity of a position in which the magnetic tape 16 starts engaging the drums 4, 5. This arrangement avoids any spacing loss which would be produced in the position wherein the magnetic tape 16 starts engaging the drums 4, 5. As a result, the waveform of a reproduced output has an envelope as shown in FIG. 3, which is free from unwanted rounded portions and is uniform throughout. Accordingly, the magnetic recording and reproducing apparatus can generate reproduced images of good quality at all times.

With the head height adjustment construction of the present invention, as described above, the head attachment plate is held against and attached to the tapered surface of the upper rotary drum, so that the sliding surface of the head will be directed obliquely upwardly to the plane of rotation of the upper rotatry drum, after the head height has been adjusted. The head gap and the magnetic tape can therefore be held in reliable contact with each other in the position in which the magnetic tape starts engaging the drums, and hence the output reproduced by the head is prevented from attenuation.

Although a certain preferred embodiment has been shown and described, it should be understood that many changes and modifications may be made therein without departing from the scope of the appended claims.

What is claimed is:

1. A head height adjustment construction in a magnetic recording and reproducing apparatus in which a magnetic tape travels in sliding contact in an oblique, downwardly inclined direction across a magnetic head mounted in an outer peripheral surface of a rotary head cylinder, wherein the head cylinder is taken as being oriented with its cylindrical axis along a vertical direction, comprising:

(a) said head cylinder having a lower fixed drum, and an upper rotary drum axially spaced from and rotatable with respect to said lower fixed drum, said upper rotary drum having a lower surface facing said lower fixed drum which has on a radial portion thereof, adjacent the outer peripheral surface of the head cylinder, a tapered mounting surface which is inclined in an upward and radially outward direction;

(b) a head attachment plate having one end mounted to said upper rotary drum on said tapered mounting surface and supporting the magnetic head on an opposite end thereof such that a head surface of the magnetic head is pointed substantially in the upward, radially outward direction of the tapered mounting surface; and (c) adjustment means disposed in the lower surface of said upper rotary drum for making small adjustments of said head attachment plate away from said tapered mounting surface, whereby when the head height of the magnetic head is adjusted by spacing the head adjustment plate away from the tapered mounting surface, the head surface of the magnetic head can be maintained pointed at an upward angle relative to a horizontal plane of the head cylinder such that the head surface is kept in reliable contact with the obliquely downwardly moving tape in order in avoid any spacing loss reducing a reproduced output produced from the magnetic tape.

2. A head height adjustment construction according to claim 1, wherein said adjustment means is an adjustment screw threaded in said upper rotary drum and having one end bearing against said head attachment plate, said screw being rotatable axially for making the small spacing adjustments.

* * * * *